US010645688B2

(12) United States Patent
Luo et al.

(10) Patent No.: US 10,645,688 B2
(45) Date of Patent: May 5, 2020

(54) TIME-FREQUENCY RESOURCE ALLOCATION METHOD AND APPARATUS

(71) Applicant: Huawei Technologies Co., Ltd., Shenzhen, Guangdong (CN)

(72) Inventors: Hejia Luo, Hangzhou (CN); Yue Zhou, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 16/170,730

(22) Filed: Oct. 25, 2018

(65) Prior Publication Data

US 2019/0069282 A1   Feb. 28, 2019

Related U.S. Application Data

(63) Continuation of application No. PCT/CN2017/077442, filed on Mar. 21, 2017.

(30) Foreign Application Priority Data

Apr. 26, 2016 (CN) .......................... 2016 1 0266301

(51) Int. Cl.
*H04W 72/04* (2009.01)
*H04L 5/00* (2006.01)
(52) U.S. Cl.
CPC ......... *H04W 72/044* (2013.01); *H04L 5/0037* (2013.01); *H04L 5/0048* (2013.01);
(Continued)
(58) Field of Classification Search
None
See application file for complete search history.

(56) References Cited

U.S. PATENT DOCUMENTS

2013/0114756 A1*  5/2013  Jia ............................ H04J 11/00
                                                            375/295
2014/0226636 A1    8/2014  Xu et al.
(Continued)

FOREIGN PATENT DOCUMENTS

CN      101005326 A    7/2007
CN      102195906 A    9/2011
(Continued)

OTHER PUBLICATIONS

ZTE, "Downlink DMRS redunction for small cell," R1-130138, 3GPP TSG RAN WG1 Meeting #72, St Julian's, Malta, Jan. 28-Feb. 1, 2013, 6 pages.
(Continued)

*Primary Examiner* — Brian S Roberts
(74) *Attorney, Agent, or Firm* — Fish & Richarson P.C.

(57) ABSTRACT

Embodiments of this application provide a time-frequency resource allocation method and apparatus. The method includes: determining, by a network device, N terminal device types based on a current movement speed of a terminal device within a coverage area, where the N terminal device types are in a one-to-one correspondence with N demodulation reference signals (DMRSs) with different time domain densities; classifying, by the network device, available time-frequency resources into N time-frequency resource groups based on the N terminal device types, where a first DMRS in the N DMRSs is configured for a first time-frequency resource group in the N time-frequency resource groups; and sending, by the network device, resource indication information to the terminal device based on the N time-frequency resource groups.

15 Claims, 7 Drawing Sheets

(52) U.S. Cl.
CPC .......... *H04L 5/0085* (2013.01); *H04L 5/0094* (2013.01); *H04W 72/04* (2013.01); *H04W 72/048* (2013.01); *H04L 5/0007* (2013.01); *H04L 5/0069* (2013.01)

(56) References Cited

U.S. PATENT DOCUMENTS

| | | |
|---|---|---|
| 2014/0269520 A1 | 9/2014 | Yi et al. |
| 2015/0288483 A1 | 10/2015 | Sun et al. |
| 2015/0312010 A1* | 10/2015 | Urabayashi ........... H04W 48/12 370/329 |
| 2015/0373694 A1 | 12/2015 | You et al. |
| 2015/0381331 A1 | 12/2015 | Kim et al. |
| 2016/0020882 A1* | 1/2016 | Shimezawa ........... H04L 5/0051 370/330 |
| 2016/0037491 A1 | 2/2016 | Hwang et al. |
| 2017/0311188 A1* | 10/2017 | Sun ....................... H04L 5/0048 |
| 2018/0167184 A1* | 6/2018 | Zhou ..................... H04L 5/0048 |
| 2018/0212733 A1* | 7/2018 | Khoryaev ............. H04L 5/0051 |

FOREIGN PATENT DOCUMENTS

| | | |
|---|---|---|
| CN | 105191461 A | 12/2015 |
| WO | 2014088195 A1 | 6/2014 |

OTHER PUBLICATIONS

3GPP TR 45.820 V13.1.0 (Nov. 2015), Technical Report, 3rd Generation Partnership Project; Technical Specification Group GSM/EDGE Radio Access Network; Cellular system support for ultra-low complexity and low throughput Internet of Things (CIoT) (Release 13), Nov. 2015, 495 pages.

3GPP TR 45.820 V2.1.0 (Aug. 2015), Technical Report, 3rd Generation Partnership Project; Technical Specification Group GSM/EDGE Radio Access Network; Cellular System Support for Ultra Low Complexity and Low Throughput Internet of Things; (Release 13), Aug. 2015, 524 pages.

Extended European Search Report issued in application No. 17788568.8, dated Jun. 14, 2019, 22 pages.

* cited by examiner

TIME-FREQUENCY RESOURCE ALLOCATION METHOD AND APPARATUS

CROSS-REFERENCE TO RELATED APPLICATIONS

This application is a continuation of International Application No. PCT/CN2017/077442, filed on Mar. 21, 2017, which claims priority to Chinese Patent Application No. 201610266301.8, filed on Apr. 26, 2016. The disclosures of the aforementioned applications are hereby incorporated by reference in their entireties.

TECHNICAL FIELD

This application relates to the field of communications technologies, and more specifically, to a time-frequency resource allocation method and apparatus.

BACKGROUND

A demodulation reference signal (DMRS) is a reference signal of an uplink physical channel in a communications system. A network device needs to complete estimation of an uplink data channel by using the DMRS, so as to complete data demodulation. In different systems, terminal device performance and redundancy overheads need to be comprehensively considered in a design of a DMRS time domain density, so as to meet a specific scenario requirement.

In the prior art, for a communications system, a DMRS time domain density is fixed, and a network device cannot configure a DMRS with a proper time domain density for the terminal device based on a current movement speed of the terminal device. However, in some application scenarios, for example, cellular Internet of Things (CIoT), a movement speed of the terminal device has a specific dynamic range. If a DMRS time domain density is relatively low for the terminal device, the network device cannot track a time-varying channel of the terminal device and implement coherent demodulation of control or data. If a DMRS time domain density is relatively high for the terminal device, DMRS redundancy in a time-frequency resource used by the terminal device is very high.

SUMMARY

Embodiments of this application provide a time-frequency resource allocation method and apparatus, so as to ensure accuracy of a network device in estimating a channel of a terminal device, and avoid excessive DMRS overheads in a time-frequency resource used by the terminal device, thereby ensuring transmission efficiency of uplink data.

According to a first aspect, a time-frequency resource allocation method is provided, including: determining, by a network device, N terminal device types based on a current movement speed of a terminal device within a coverage area, where the N terminal device types are in a one-to-one correspondence with N demodulation reference signals DMRSs with different time domain densities; classifying, by the network device, available time-frequency resources into N time-frequency resource groups based on the N terminal device types, where a first DMRS in the N DMRSs is configured for a first time-frequency resource group in the N time-frequency resource groups; and sending, by the network device, resource indication information to the terminal device based on the N time-frequency resource groups, where the resource indication information is used to indicate a target time-frequency resource allocated by the network device to the terminal device or is used to indicate the N time-frequency resource groups, and N is an integer greater than or equal to 2.

According to the time-frequency resource allocation method provided in an embodiment of this application, the network device classifies the terminal device into N terminal device types based on a current movement speed, classifies the time-frequency resources into N time-frequency resource groups based on the N terminal device types, and then configures a DMRS with a corresponding time domain density for a time-frequency resource in a time-frequency resource group corresponding to terminal devices with different terminal device types. In this way, the terminal device may transmit uplink data on a corresponding time-frequency resource based on a DMRS whose time domain density is corresponding to a terminal device type of the terminal device. Therefore, in this embodiment of this application, terminal devices at different current movement speeds may use, based on a requirement, a DMRS whose time domain density is corresponding to a current movement speed of the terminal device, so as to ensure accuracy of the network device in estimating a channel of the terminal device, and avoid excessive DMRS overheads in a time-frequency resource used by the terminal device, thereby ensuring transmission efficiency of the uplink data.

In a first possible implementation of the first aspect, the N terminal device types include a static terminal device, a semi-static terminal device, and a dynamic terminal device, where the static terminal device is a terminal device whose current movement speed is lower than a first threshold, the semi-static terminal device is a terminal device whose current movement speed is higher than or equal to the first threshold and lower than a second threshold, and the dynamic terminal device is a terminal device whose current movement speed is higher than or equal to the second threshold; and the first threshold is less than the second threshold.

With reference to the foregoing possible implementation of the first aspect, in a second possible implementation of the first aspect, the DMRSs with N time domain densities include a sparse DMRS, a conventional DMRS, and a dense DMRS, where the sparse DMRS is a DMRS whose time domain density is less than a third threshold, and the conventional DMRS is a DMRS whose time domain density is greater than or equal to the third threshold and is less than a fourth threshold; the dense DMRS is a DMRS whose time domain density is greater than or equal to the fourth threshold, the static terminal device is corresponding to the sparse DMRS, the semi-static terminal device is corresponding to the conventional DMRS, and the dynamic terminal device is corresponding to the dense DMRS; and the third threshold is less than the fourth threshold.

With reference to the foregoing possible implementations of the first aspect, in a third possible implementation of the first aspect, the resource indication information is carried in grant information, and the resource indication information is used to indicate the target time-frequency resource allocated by the network device to the terminal device; and before the sending, by the network device, resource indication information to the terminal device based on the N time-frequency resource groups, the method further includes: receiving, by the network device, scheduling request information sent by the terminal device, where the scheduling request information carries a terminal device type of the terminal device; and determining, by the network device, the target time-frequency resource from the N time-frequency resource groups based on the terminal device type of the terminal device.

In this way, in a grant transmission mode, the terminal device may directly carry the terminal device type of the terminal device in the scheduling request information, and the network device determines, based on the scheduling request information, a time-frequency resource used by the terminal device, and notifies the terminal device by using the grant information.

With reference to the foregoing possible implementations of the first aspect, in a fourth possible implementation of the first aspect, after the classifying, by the network device, available time-frequency resources into N time-frequency resource groups based on the N terminal device types, the method further includes: determining, by the network device from the N DMRSs based on first mapping relationship information, a DMRS corresponding to the terminal device type of the terminal device, where the first mapping relationship information is used to indicate a one-to-one correspondence between type identifiers of the N terminal device types and the N DMRSs; and configuring, by the network device, for a time-frequency resource in a time-frequency resource group corresponding to the terminal device type of the terminal device, a DMRS corresponding to the terminal device type of the terminal device.

With reference to the foregoing possible implementations of the first aspect, in a fifth possible implementation of the first aspect, the resource indication information is used to indicate the N time-frequency resource groups; and the sending, by the network device, resource indication information to the terminal device based on the N time-frequency resource groups includes: broadcasting, by the network device, the resource indication information by using a physical broadcast channel PBCH.

In this implementation, the network device and the terminal device use the grant free transmission mode. Information about the time-frequency resource group is broadcast by using the network device. The terminal device freely contends for a time-frequency resource in a corresponding time-frequency resource group, so as to transmit the uplink data by using the time-frequency resource that is configured with a DMRS with a corresponding time domain density.

With reference to the foregoing possible implementations of the first aspect, in a sixth possible implementation of the first aspect, the N time-frequency resource groups are obtained through classification by the network device based on a first grouping rule in at least one grouping rule, and the resource indication information carries a rule identifier of the first grouping rule; and before the broadcasting, by the network device, the resource indication information by using a physical broadcast channel PBCH, the method further includes: determining, by the network device, the rule identifier of the first grouping rule based on second mapping relationship information, where the second mapping relationship information is used to indicate a one-to-one correspondence between the at least one grouping rule and at least one rule identifier.

With reference to the foregoing possible implementations of the first aspect, in a seventh possible implementation of the first aspect, the first grouping rule is that the N time-frequency resource groups are corresponding to different frequency resources, or the first grouping rule is that the N time-frequency resource groups are corresponding to different time resources.

With reference to the foregoing possible implementations of the first aspect, in an eighth possible implementation of the first aspect, before the classifying, by the network device, available time-frequency resources into N time-frequency resource groups based on the N terminal device types, the method further includes: determining, by the network device, a quantity of terminal devices that are corresponding to the N terminal device types; and the classifying, by the network device, available time-frequency resources into N time-frequency resource groups based on the N terminal device types includes: classifying, by the network device, the available time-frequency resources into N time-frequency resource groups based on the N terminal device types and a quantity of the N terminal devices.

In this way, grouping of the time-frequency resources by the network device may be performed based on a terminal device type and a quantity of terminal devices corresponding to the terminal device type, so that grouping of the time-frequency resources is more flexible.

According to a second aspect, another time-frequency resource allocation method is provided, including: receiving, by a terminal device, resource indication information sent by a network device, where the resource indication information is used to indicate a target time-frequency resource allocated by the network device to the terminal device or is used to indicate the N time-frequency resource groups; determining, by the terminal device, the target time-frequency resource based on the resource indication information, where the target time-frequency resource is a time-frequency resource in a target time-frequency resource group that is corresponding to a terminal device type of the terminal device and that is in the N time-frequency resource groups, the N time-frequency resource groups are obtained through classification by the network device based on N terminal device types, the N terminal device types are in a one-to-one correspondence with N demodulation reference signals DMRSs with different time domain densities, a first DMRS in the N DMRSs is configured for a first time-frequency resource group in the N time-frequency resource groups, and the N terminal device types are determined by the network device based on a current movement speed of the terminal device within a coverage area, and N is an integer greater than or equal to 2; and transmitting, by the terminal device, uplink data to the network device by using the target time-frequency resource.

In a first possible implementation of the second aspect, the N terminal device types include a static terminal device, a semi-static terminal device, and a dynamic terminal device, where the static terminal device is a terminal device whose current movement speed is lower than a first threshold, the semi-static terminal device is a terminal device whose current movement speed is higher than or equal to the first threshold and lower than a second threshold, and the dynamic terminal device is a terminal device whose current movement speed is higher than or equal to the second threshold; and the first threshold is less than the second threshold.

With reference to the foregoing possible implementation of the second aspect, in a second possible implementation of the second aspect, the DMRSs with N time domain densities include a sparse DMRS, a conventional DMRS, and a dense DMRS, where the sparse DMRS is a DMRS whose time domain density is less than a third threshold, and the conventional DMRS is a DMRS whose time domain density is greater than or equal to the third threshold and is less than a fourth threshold; the dense DMRS is a DMRS whose time domain density is greater than or equal to the fourth threshold, the static terminal device is corresponding to the sparse DMRS, the semi-static terminal device is corresponding to the conventional DMRS, and the dynamic terminal device is corresponding to the dense DMRS; and the third threshold is less than the fourth threshold.

With reference to the foregoing possible implementations of the second aspect, in a third possible implementation of the second aspect, before the receiving, by a terminal device, resource indication information sent by a network device, the method further includes: receiving, by the terminal device, scheduling request information sent by the network device, where the scheduling request information carries the terminal device type of the terminal device; and the receiving, by a terminal device, resource indication information sent by a network device includes: receiving, by the terminal device, grant information sent by the network device, where the grant information carries the resource indication information, and the resource indication information is used to indicate the target time-frequency resource allocated by the network device to the terminal device.

With reference to the foregoing possible implementations of the second aspect, in a fourth possible implementation of the second aspect, a DMRS corresponding to the terminal device type of the terminal device is determined by the network device based on first mapping relationship information, and the first mapping relationship information is used to indicate a one-to-one correspondence between the N terminal device types and the N DMRSs.

With reference to the foregoing possible implementations of the second aspect, in a fifth possible implementation of the second aspect, the resource indication information is used to indicate the N time-frequency resource groups; and the receiving, by a terminal device, resource indication information sent by a network device includes: obtaining, by the terminal device, the resource indication information by using a physical broadcast channel PBCH.

With reference to the foregoing possible implementations of the second aspect, in a sixth possible implementation of the second aspect, the N time-frequency resource groups are obtained through classification by the network device based on a first grouping rule in at least one grouping rule, and the resource indication information carries a rule identifier corresponding to the first grouping rule; and the determining, by the terminal device, the target time-frequency resource based on the resource indication information includes: determining, by the terminal device, the target time-frequency resource group based on second mapping relationship information and the resource indication information, where the second mapping relationship information is used to indicate a one-to-one correspondence between the at least one grouping rule and at least one rule identifier.

With reference to the foregoing possible implementations of the second aspect, in a seventh possible implementation of the second aspect, the first grouping rule is that the N time-frequency resource groups are corresponding to different frequency resources, or the first grouping rule is that the N time-frequency resource groups are corresponding to different time resources.

According to a third aspect, a time-frequency resource allocation apparatus is provided, and is configured to perform the method in any one of the first aspect or the possible implementations of the first aspect.

Specifically, the apparatus includes units for performing the method in any one of the first aspect or the possible implementations of the first aspect.

According to a fourth aspect, a time-frequency resource allocation apparatus is provided, and is configured to perform the method in any one of the second aspect or the possible implementations of the second aspect.

Specifically, the apparatus includes units for performing the method in any one of the second aspect or the possible implementations of the second aspect.

According to a fifth aspect, a time-frequency resource allocation apparatus is provided, and the apparatus includes a receiver, a transmitter, a memory, a processor, and a bus system. The receiver, the transmitter, the memory, and the processor are connected by using the bus system. The memory is configured to store an instruction, and the processor is configured to execute the instruction stored in the memory, so as to control the receiver to receive a signal and control the transmitter to send a signal. When the processor executes the instruction stored in the memory, the execution enables the processor to perform the method in any one of the first aspect or the possible implementations of the first aspect.

According to a sixth aspect, a time-frequency resource allocation apparatus is provided, and the apparatus includes a receiver, a transmitter, a memory, a processor, and a bus system. The receiver, the transmitter, the memory, and the processor are connected by using the bus system. The memory is configured to store an instruction, and the processor is configured to execute the instruction stored in the memory, so as to control the receiver to receive a signal and control the transmitter to send a signal. When the processor executes the instruction stored in the memory, the execution enables the processor to perform the method in any one of the second aspect or the possible implementations of the second aspect.

According to a seventh aspect, a time-frequency resource allocation system is provided, and the system includes the apparatus in any one of the third aspect or the possible implementations of the third aspect and the apparatus in any one of the fourth aspect or the possible implementations of the fourth aspect; or the system includes the apparatus in any one of the fifth aspect or the possible implementations of the fifth aspect and the apparatus in any one of the sixth aspect or the possible implementations of the sixth aspect.

According to an eighth aspect, a computer readable medium is provided, and is configured to store a computer program, and the computer program includes an instruction used to perform the method in any one of the first aspect or the possible implementations of the first aspect.

According to a ninth aspect, a computer readable medium is provided, and is configured to store a computer program, and the computer program includes an instruction used to perform the method in any one of the second aspect or the possible implementations of the second aspect.

DESCRIPTION OF EMBODIMENTS

Figure 1:
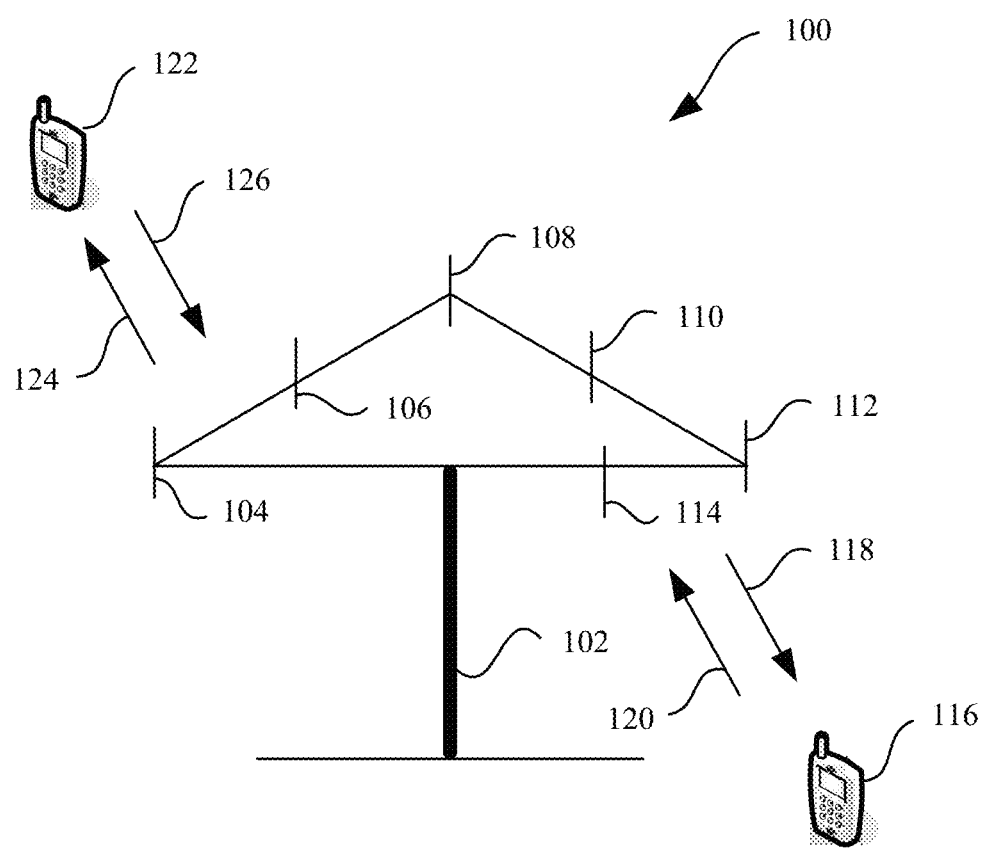
FIG. 1 is a schematic diagram of a communications system to which an embodiment of this application is applied.

The following describes the technical solutions in the embodiments of this application with reference to the accompanying drawings in the embodiments of this application.

It should be understood that the technical solutions of the embodiments of this application may be applied to various communications systems, such as: a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a worldwide interoperability for microwave access (WiMAX) communications system, and a future 5G communications system.

It should be further understood that the technical solutions of the embodiments of this application may be further applied to various communications systems that are based on a non-orthogonal multiple access technology, such as a sparse code multiple access (SCMA) system. Certainly, the SCMA may also have another name in the communications field. Further, the technical solutions in the embodiments of this application may be applied to a multicarrier transmission system that uses the non-orthogonal multiple access technology, such as an orthogonal frequency division multiplexing (OFDM) system, a filter bank multicarrier (FBMC) system, a generalized frequency division multiplexing (GFDM) system, or a filtered-orthogonal frequency division multiplexing (F-OFDM) system that uses the non-orthogonal multiple access technology.

It should also be understood that a terminal device in the embodiments of this application may communicate with one or more core networks by using a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN).

It should be further understood that, in the embodiments of this application, a network device may be configured to communicate with a terminal device. The network device may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, an in-vehicle device, a wearable device, a network-side device in a future 5G network, a network device in a future evolved PLMN network, or the like.

Communication supported by an existing cellular communications system such as a GSM system, a WCDMA system, or an LTE system is mainly includes voice communication and data communication. Generally, a quantity of connections supported by a conventional base station is limited and can be easily implemented.

A next-generation mobile communications system will not only support conventional communication, but also support machine-to-machine (M2M) communication that is also referred to as machine type communication (MTC). A cellular Internet of Things (CIoT) system is an important MTC communications system based on an existing cellular network infrastructure. A main service scope of future Internet of things communication may cover smart metering, medical examination and monitoring, logistics inspection, industrial inspection and monitoring, Internet of vehicles, smart communities, communication of wearable devices, and the like. Service types of the future Internet of things communication are significantly different from each other. Therefore, requirements for a network are significantly different from each other.

FIG. 1 is a schematic diagram of a communications system to which an embodiment of this application is applied. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. Two antennas are shown for each antenna group in FIG. 1. However, each group may have more or fewer antennas. The network device 102 may additionally include a transmitter chain and a receiver chain. A person of ordinary skill in the art may understand that both the transmitter chain and the receiver chain may include a plurality of components, such as a processor, a modulator, a multiplexer, a demodulator, a demultiplexer, or an antenna related to signal transmission and reception.

The network device 102 may communicate with a plurality of terminal devices, for example, the network device 102 may communicate with a terminal device 116 and a terminal device 122. However, it may be understood that the network device 102 may communicate with any quantity of terminal devices that are similar to the terminal device 116 or 122. For example, the terminal devices 116 and 122 may be cellular phones, smartphones, portable computers, handheld communications devices, handheld computing devices, satellite radio apparatuses, the Global Positioning System, PDAs, and/or any other suitable devices configured to communicate in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in an FDD system, the forward link 118 may use a frequency band different from that used by the reverse link 120, and the forward link 124 may use a frequency band that is different from that used by the reverse link 126.

For another example, in a TDD system and a full-duplex system, the forward link 118 and the reverse link 120 may use a same frequency band, and the forward link 124 and the reverse link 126 may use a same frequency band.

Each antenna group and/or each area that are/is designed for communication are/is referred to as a sector of the network device 102. For example, the antenna group may be designed to communicate with a terminal device in a sector in a coverage area of the network device 102. In a process in which the network device 102 communicates with the terminal devices 116 and 122 by using the forward links 118 and 124 respectively, a transmit antenna of the network device 102 may improve signal-to-noise ratios of the forward links 118 and 124 through beamforming. In addition, compared with a manner in which a network device sends signals to all terminal devices connected to the network device by using a single antenna, when the network device 102 sends, through beamforming, signals to the terminal devices 116 and 122 that are randomly scattered in a related coverage area, less interference is caused to a mobile device in a neighboring cell.

At a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain a specific quantity of data bits that need to be sent to the wireless communications receiving apparatus by using a channel. For example, the wireless communications sending apparatus may generate, receive from another communications apparatus, or save in a memory, a specific quantity of data bits that need to be sent to the wireless communications receiving apparatus by using a channel. The data bits may be included in a transport block or a plurality of transport blocks of data, and the transport block may be segmented to generate a plurality of code blocks.

In this embodiment of this application, a plurality of terminal devices may multiplex a same time-frequency resource to transmit uplink data, or one time-frequency resource is used by only one terminal device to transmit uplink data. Therefore, the network device may perform data transmission with one or more terminal devices at a same moment. Because a data transmission process of the network device is similar to that of each terminal device, for ease of understanding and description, the following uses a process of transmitting data by the network device and one terminal device in the plurality of terminal devices as an example for description.

Figure 2:
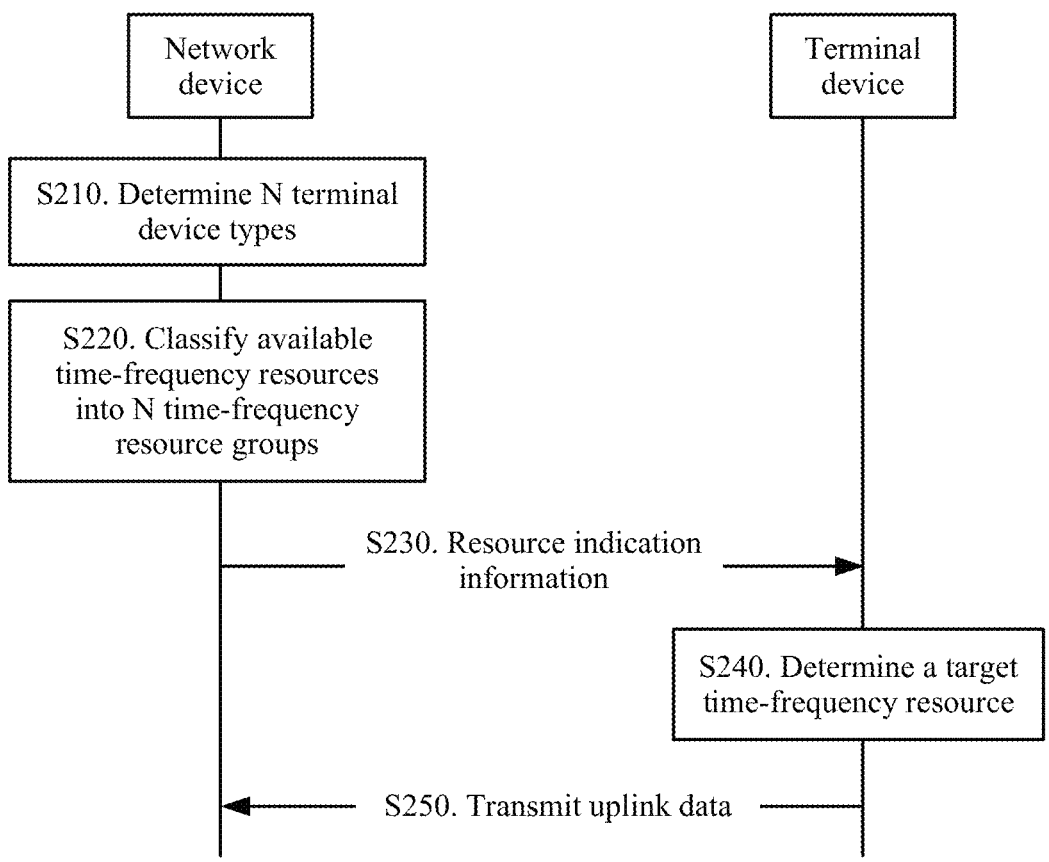
FIG. 2 is a schematic flowchart of a time-frequency resource allocation method according to an embodiment of this application.

FIG. 2 is a schematic flowchart of a time-frequency resource allocation method 200 according to an embodiment of this application. The method 200 may be applied to the communications system 100 shown in FIG. 1. However, this is not limited in this embodiment of this application.

S210. A network device determines N terminal device types based on a current movement speed of a terminal device within a coverage area, where the N terminal device types are in a one-to-one correspondence with N demodulation reference signals DMRSs with different time domain densities.

S220. The network device classifies available time-frequency resources into N time-frequency resource groups based on the N terminal device types, where a first DMRS in the N DMRSs is configured for a first time-frequency resource group in the N time-frequency resource groups.

S230. The network device sends resource indication information to the terminal device based on the N time-frequency resource groups, where the resource indication information is used to indicate a target time-frequency resource allocated by the network device to the terminal device or is directly used to indicate the N time-frequency resource groups.

S240. The terminal device receives the resource indication information sent by the network device, and determines the target time-frequency resource based on the resource indication information, where the target time-frequency resource is a time-frequency resource in a target time-frequency resource group that is corresponding to a terminal device type of the terminal device and that is in the N time-frequency resource groups.

S250. The terminal device transmits uplink data to the network device by using the target time-frequency resource.

Herein, it should be understood that available time-frequency resources in different communications systems are different. Therefore, in this embodiment of this application, the available time-frequency resources are for time-frequency resources in a same communications system.

Figure 3:
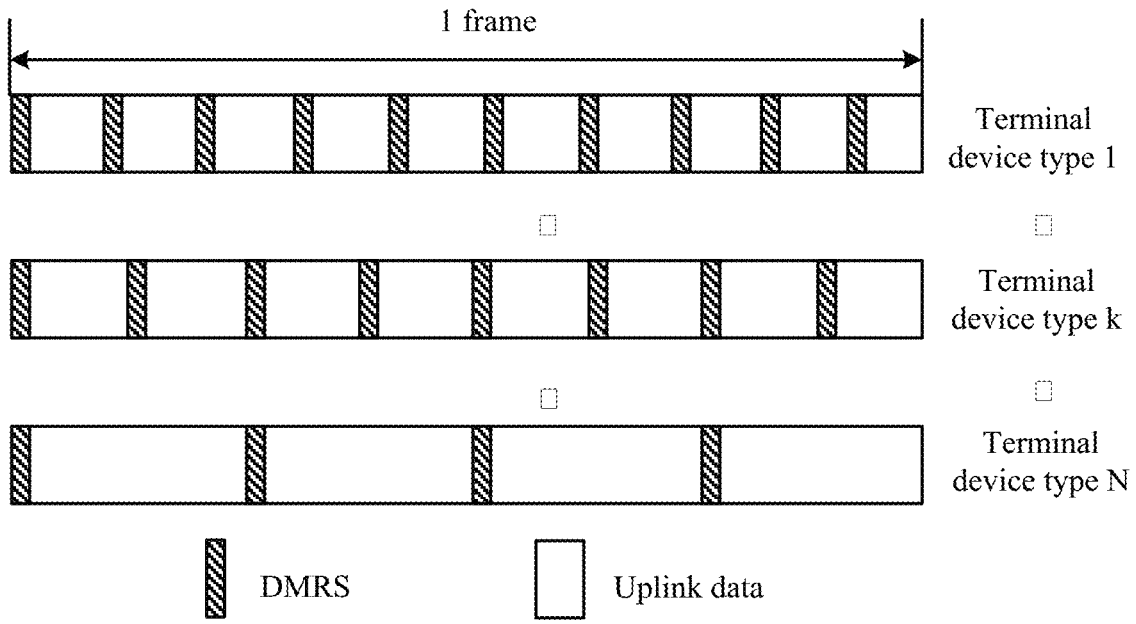
FIG. 3 is a schematic diagram of a correspondence between a terminal device type and DMRS distribution according to an embodiment of this application.

Specifically, in S210, the N terminal device types are obtained through classification by the network device based on the current movement speed of the terminal device, and the current movement speed of the terminal device in the N terminal device types is proportional to a time domain density of the DMRS with N time domain densities, that is, a terminal device with a high average speed is corresponding to a DMRS with a high time domain density, and a terminal device with a low average speed is corresponding to a DMRS with a low time domain density. FIG. 3 shows a correspondence between N terminal device types and N DMRSs with different time domain densities. In FIG. 3, current movement speeds of terminal devices corresponding to a terminal device type 1 to a terminal device type N are successively reduced, and therefore, time domain densities of DMRSs corresponding to the terminal device type 1 to the terminal device type N are also successively reduced.

Herein, classification of terminal device types may be performed once by the network device at an interval, or may be performed once whenever a new terminal device accesses the network device. This is not limited in this embodiment of this application.

It should be understood that time domain density distribution of the DMRSs in FIG. 3 is merely an example, and the foregoing N terminal device types may alternatively be corresponding to DMRSs of other time domain densities. This is not limited in this embodiment of this application.

In an optional embodiment, the N terminal device types include a static terminal device, a semi-static terminal device, and a dynamic terminal device. The static terminal device is a terminal device whose current movement speed is lower than a first threshold, the semi-static terminal device is a terminal device whose current movement speed is higher than or equal to the first threshold and lower than a second threshold, and the dynamic terminal device is a terminal device whose current movement speed is higher than or equal to the second threshold; and the first threshold is less than the second threshold.

In an optional embodiment, the DMRSs with N time domain densities include a sparse DMRS, a conventional DMRS, and a dense DMRS. The sparse DMRS is a DMRS whose time domain density is less than a third threshold, and the conventional DMRS is a DMRS whose time domain density is greater than or equal to the third threshold and is less than a fourth threshold, and the dense DMRS is a DMRS whose time domain density is greater than or equal to the fourth threshold; and the third threshold is less than the fourth threshold. The static terminal device is corresponding to the sparse DMRS, and the semi-static terminal device is corresponding to the conventional DMRS, and the dynamic terminal device is corresponding to the dense DMRS.

Specifically, in S220, the network device may classify the available time-frequency resources into N time-frequency resource groups based on the N terminal device types. The N terminal device types are in a one-to-one correspondence with the DMRSs with N time domain densities. Therefore, the network device may separately configure, based on the N DMRSs corresponding to N terminal device types, DMRSs with different time domain densities for time-frequency resources in time-frequency resource groups corresponding to different terminal device types. In this way, the terminal device may use a time-frequency resource in a corresponding time-frequency resource group based on a terminal device type of the terminal device, that is, transmit uplink data based on a DMRS with a corresponding time domain density.

In S230, the resource indication information herein may be understood as that after learning the terminal device type of the terminal device, the network device instructs the terminal device to use a target time-frequency resource in a target time-frequency resource group in the N time-frequency resource groups, that is, a time-frequency resource in a time-frequency resource group corresponding to the terminal device type of the terminal device. The resource indication information may alternatively be understood as that the network device notifies the terminal device of a status of the N time-frequency resource groups by using the resource indication information, and the terminal device determines a target time-frequency resource group in the N time-frequency resource groups based on the terminal device type of the terminal device and uses a corresponding time-frequency resource to transmit uplink data in a contention-based manner.

Currently, an air interface technology commonly used in a communications system may be classified into two manners: non-spread spectrum non-aliasing modulation and spread spectrum aliasing modulation. The non-spread spectrum non-aliasing modulation means that a terminal device uses single-carrier transmission, and one terminal device is corresponding to one carrier. The spread spectrum aliasing modulation means that one terminal device is corresponding to a plurality of carriers, and data of a plurality of terminal devices is mapped to a corresponding carrier through overlapping. Specifically, spread spectrum technologies include OFDMA, SCMA, a low density signature (LDS), and the like. OFDMA is an orthogonal spread spectrum technology, and SCMA and LDS are non-orthogonal spread spectrum technologies. A difference between the LDS and the SCMA lies in different spread spectrum sequences. For an LTE system, a single carrier frequency division multiple access (SC-FDMA) technology is used for uplink transmission. In the single carrier frequency division multiple access technology, different subcarriers are allocated to different terminal devices, so as to implement transmission on a single subcarrier. The LDS has a special CDMA propagation sequence. The LDS distributes only a small quantity of non-zero elements in a large characteristic length, so as to implement multi-user information detection by using a message passing algorithm (MPA). The SCMA is a non-orthogonal multiple access method using a codebook sparse feature, for example, a system that uses a 4*6 SCMA codebook. When four narrowband carriers are occupied, based on a resource mapping location indicated by a selected codebook, six terminal devices overlap with each other to occupy the four narrowband carriers, and each terminal device occupies, based on a selected codebook, only two narrowband carriers in the four narrowband carriers to transmit data.

In a non-spread spectrum non-aliasing modulation manner, a minimum frequency granularity for scheduling by a terminal device may be a single carrier, that is, in frequency domain, one terminal device uses one carrier to transmit data, terminal devices do not affect each other, and a time-frequency resource used by the terminal device is determined by a type of the terminal device. However, in a spread spectrum aliasing modulation manner, in an example in which four carriers are used, six terminal devices occupy four carriers to transmit data. Because the terminals overlap with each other to occupy the carriers, densities of DMRSs corresponding to the four carriers need to be the same, that is, terminal device types of the six terminal devices that simultaneously occupy the four subcarriers need to be the same. Therefore, if the spread spectrum aliasing modulation manner is used, terminal devices of a same type use a time-frequency resource in a corresponding time-frequency resource group to perform transmission, so as to ensure that these terminal devices of the same type use DMRSs with a same time domain density.

Figure 4:
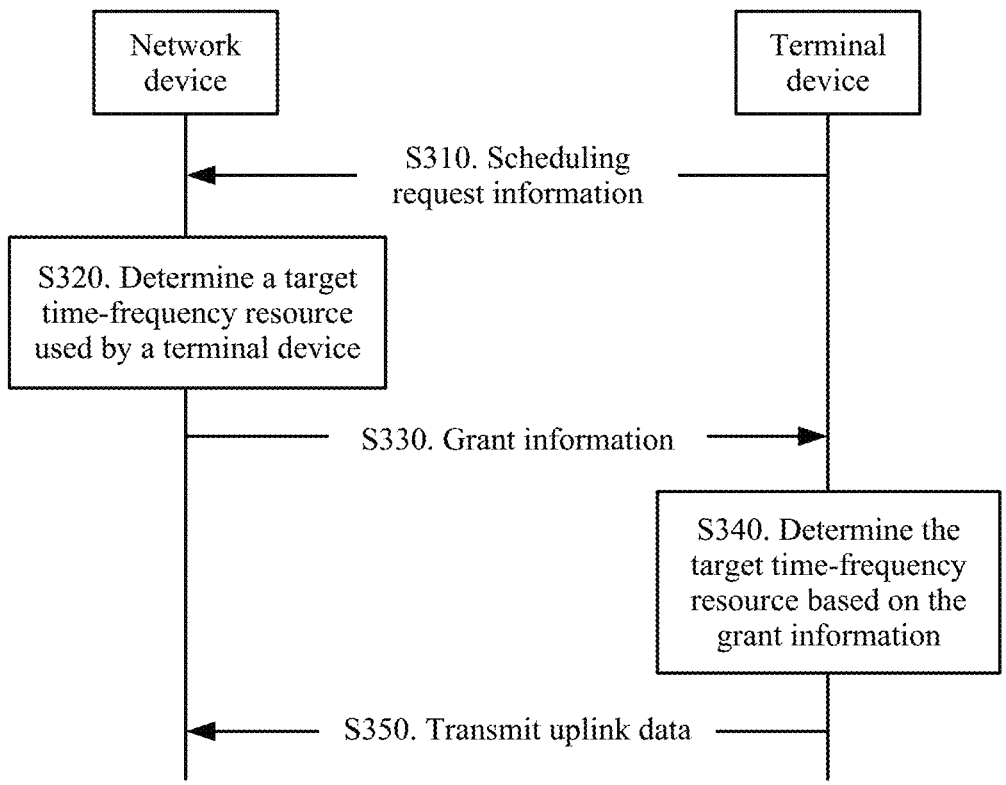
FIG. 4 is a schematic flowchart of another time-frequency resource allocation method according to an embodiment of this application.

In an optional embodiment, as shown in FIG. 4, before the network device sends resource indication information to a terminal device based on the N time-frequency resource groups, the method further includes:

S310. The terminal device sends scheduling request information to the network device, where the scheduling request information carries a terminal device type of the terminal device.

S320. The network device receives the scheduling request information, and determines, based on the terminal device type of the terminal device, a target time-frequency resource used by the terminal device in a data transmission process.

S330. The network device sends grant information to the terminal device, where the grant information carries the resource indication information, and the resource indication information is used to indicate the target time-frequency resource allocated by the network device to the terminal device.

S340. The terminal device receives the grant information, and determines the target time-frequency resource based on an indication in the grant information.

S350. The terminal device performs uplink data transmission by using the target time-frequency resource.

It should be understood that data transmission between the network device and the terminal device may be classified into two modes: a grant transmission mode and a grant free (grant free) transmission mode. If the grant transmission mode is used, the terminal device needs to send scheduling request information to the network device; and the network device allocates a time-frequency resource to the terminal device based on the scheduling request information, sends grant information to the terminal device, and indicates the time-frequency resource used by the terminal device to the terminal device in the grant information.

If the grant free transmission mode is used, the terminal device does not need to send scheduling request information to the network device, and the network device does not need to send grant information to the terminal device. Grant free transmission means that a network device pre-allocates a plurality of transmission resources and notifies a terminal device, so that when needing to transmit uplink data, the terminal device selects at least one transmission resource from the plurality of transmission resources pre-allocated by the network device, and sends the uplink data by using the selected transmission resource. The grant free transmission is a contention-based transmission manner, and may be specifically: A plurality of terminals simultaneously perform uplink data transmission on a same pre-allocated time-frequency resource without requiring a grant from a base station.

Therefore, in the grant transmission mode, the resource indication information may be used to indicate the target time-frequency resource allocated by the network device to the terminal device. However, in the grant free transmission mode, the resource indication information may be used to indicate the N time-frequency resource groups.

Figure 5:
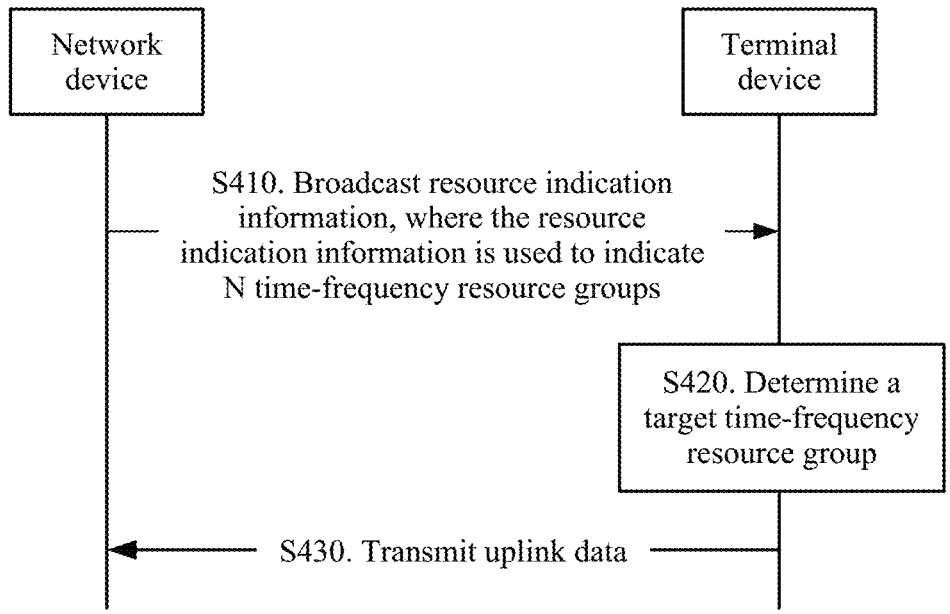
FIG. 5 is a schematic flowchart of another time-frequency resource allocation method according to an embodiment of this application.

In an optional embodiment, as shown in FIG. 5, in a grant free transmission mode, that the network device sends resource indication information to a terminal device based on the N time-frequency resource groups includes:

S410. The network device broadcasts the resource indication information by using a physical broadcast channel (PBCH), where the resource indication information is used to indicate the N time-frequency resource groups.

S420. The terminal device obtains, by using the PBCH, the resource indication information broadcast by the network device, and determines a target time-frequency resource group based on the resource indication information and a terminal device type of the terminal device.

S430. The terminal device determines a target time-frequency resource from the target time-frequency resource group through contention, and performs uplink data transmission by using the target time-frequency resource.

Specifically, in this embodiment, after classifying the N time-frequency resource groups, the network device may directly broadcast grouping information by using the PBCH. The terminal device that needs to transmit the uplink data may obtain information of the N time-frequency resource groups through broadcast, selects, based on the terminal device type of the terminal device, a target time-frequency resource in a target time-frequency resource group corresponding to the terminal device type of the terminal device from the N time-frequency resource groups, and uses the target time-frequency resource to transmit the uplink data.

In an optional embodiment, the terminal device type of the terminal device may be represented by a type identifier corresponding to the terminal device type. After the network device classifies available time-frequency resources into N time-frequency resource groups based on the N terminal device types, the method further includes:

determining, by the network device from the N DMRSs based on first mapping relationship information, a DMRS corresponding to the terminal device type of the terminal device, where the first mapping relationship information is used to indicate a one-to-one correspondence between type identifiers of the N terminal device types and the N DMRSs; and configuring, by the network device, for a time-frequency resource in a time-frequency resource group corresponding to the terminal device type of the terminal device, a DMRS corresponding to the terminal device type of the terminal device.

Specifically, in this embodiment of this application, the network device may store an entry that is used to record a one-to-one correspondence between the type identifiers of the N terminal device types and the N DMRSs, that is, a specific example of the first mapping relationship information. N DMRSs with different time domain densities may be understood as N DMRS types, and different DMRS types are corresponding to different time domain density distribution. Table 1 below shows an example of the entry.

TABLE 1

| Type Identifier | DMRS Type |
|---|---|
| 00 | Type 1 |
| 01 | Type 2 |
| 10 | Type 3 |

It should be understood that Table 1 is merely an example, and this is not limited in this embodiment of this application. For example, in Table 1, a 2-bit character is used to identify a terminal device type of a terminal device and is carried in scheduling request information sent to a network device by the terminal device. If the network device receives "01", the terminal device type of the terminal device may be determined and a DMRS type corresponding to the terminal device is "type 2". It should be understood that one or more bits may be used as a type identifier to identify a terminal device type of a terminal device, provided that the type identifier can identify all DMRS types. This is not limited in this embodiment of this application.

In an optional embodiment, the N time-frequency resource groups are obtained through classification by the network device according to a first grouping rule in at least one grouping rule, and the resource indication information further includes a rule identifier corresponding to the first grouping rule. Before the network device broadcasts the resource indication information by using the physical broadcast channel PBCH, the method further includes: determining, by the network device, the rule identifier of the first grouping rule based on second mapping relationship information, where the second mapping relationship information is used to indicate a one-to-one correspondence between the at least one grouping rule and at least one rule identifier. The terminal device obtains the resource indication information by using the PBCH, and determines the target time-frequency resource group based on the second mapping relationship information and the resource indication information.

Specifically, the network device may classify the N time-frequency resource groups according to the first grouping rule in the at least one grouping rule. In a grant transmission mode, the terminal device directly uses a time-frequency resource in a time-frequency resource group allocated by the network device to the terminal device in the grant information, and does not need to learn how the network device groups the available time-frequency resources. However, in the grant free transmission mode, the terminal device obtains information about the N time-frequency resource groups from broadcast information. The terminal device selects, based on the terminal device type of the terminal device, the target time-frequency resource group corresponding to the terminal device type of the terminal device from the N time-frequency resource groups, and then uses a time-frequency resource in the target time-frequency resource group to transmit uplink data. Therefore, in this transmission mode, the terminal device needs to learn how the network device groups the available time-frequency resources.

In this embodiment of this application, the network device may store an entry that is used to record a one-to-one correspondence between at least one grouping rule and at least one rule identifier, that is, a specific example of the second mapping relationship information. Table 2 below shows an example of the entry.

TABLE 2

| Rule Identifier | Time-frequency Resource Grouping Rule |
|---|---|
| 00 | Rule 1 |
| 01 | Rule 2 |
| 10 | Rule 3 |
| 11 | Rule 4 |

It should be understood that Table 2 is merely an example, and this is not limited in this embodiment of this application. For example, in Table 2, a 2-bit character is used to identify a grouping rule, and is carried in resource indication information sent by the network device to the terminal device, and more specifically, carried in the PBCH broadcast information. If the terminal device receives "01", it may be determined that a grouping rule used by the network device is "rule 2". It should be understood that one or more bits may be used as a rule identifier to identify a time-frequency resource grouping rule, provided that the rule identifier can identify all grouping rules. This is not limited in this embodiment of this application.

The network device may deliver the second mapping relationship information (for example, Table 2) to the terminal device by using, for example, the broadcast information.

It should be understood that the manner of obtaining the second mapping relationship information by the terminal device is merely an example. This is not limited in this application, provided that mapping relationships used by the network device or the terminal device are the same, for example, the second mapping relationship information may alternatively be preconfigured by an operator or a manufacturer in the terminal device.

In an optional embodiment, the first grouping rule is that the N time-frequency resource groups are corresponding to different frequency resources, or the first grouping rule is that the N time-frequency resource groups are corresponding to different time resources.

Figure 6:
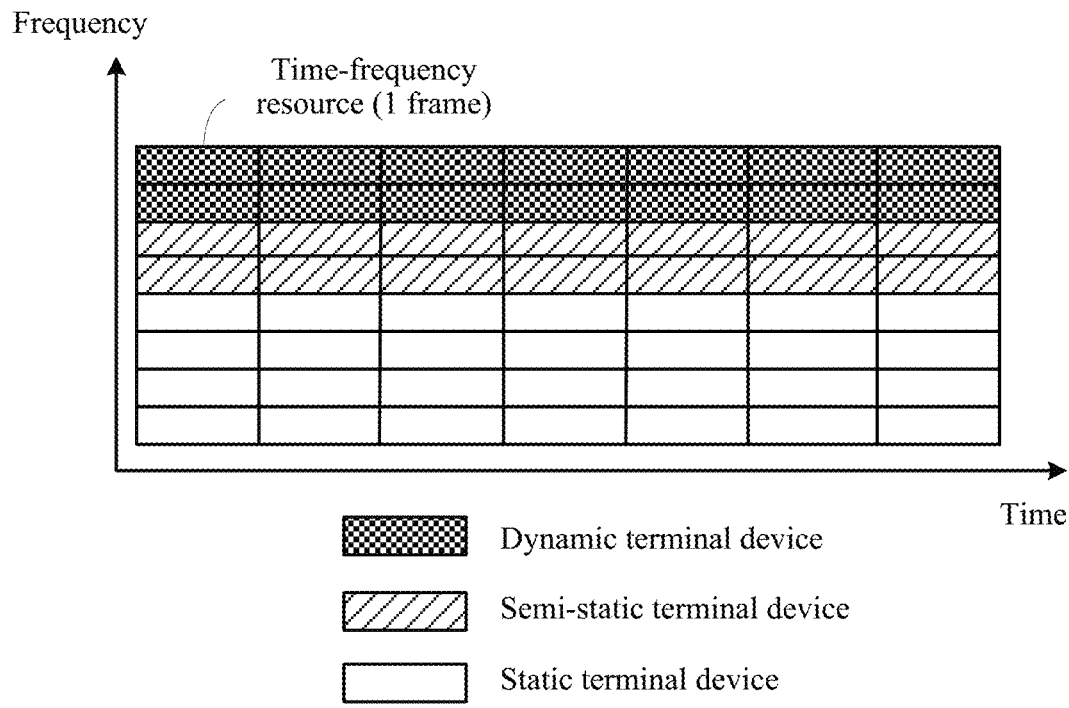
FIG. 6 is a schematic diagram of a time-frequency resource group according to an embodiment of this application.

FIG. 6 is a schematic diagram illustrating that the N time-frequency resource groups are corresponding to different frequency resources. In FIG. 6, there are three terminal device types, that is, a static terminal device, a semi-static terminal device, and a dynamic terminal device. Time-frequency resources of different types of terminal devices are classified based on a frequency. A high-speed terminal device is corresponding to a high frequency, and a static terminal device is corresponding to a low frequency. It should be understood that FIG. 6 is merely an example of classifying time-frequency resources based on a frequency. There may be many grouping rules based on the frequency, and there may be more terminal device types. This is not limited in this embodiment of this application.

Figure 7:
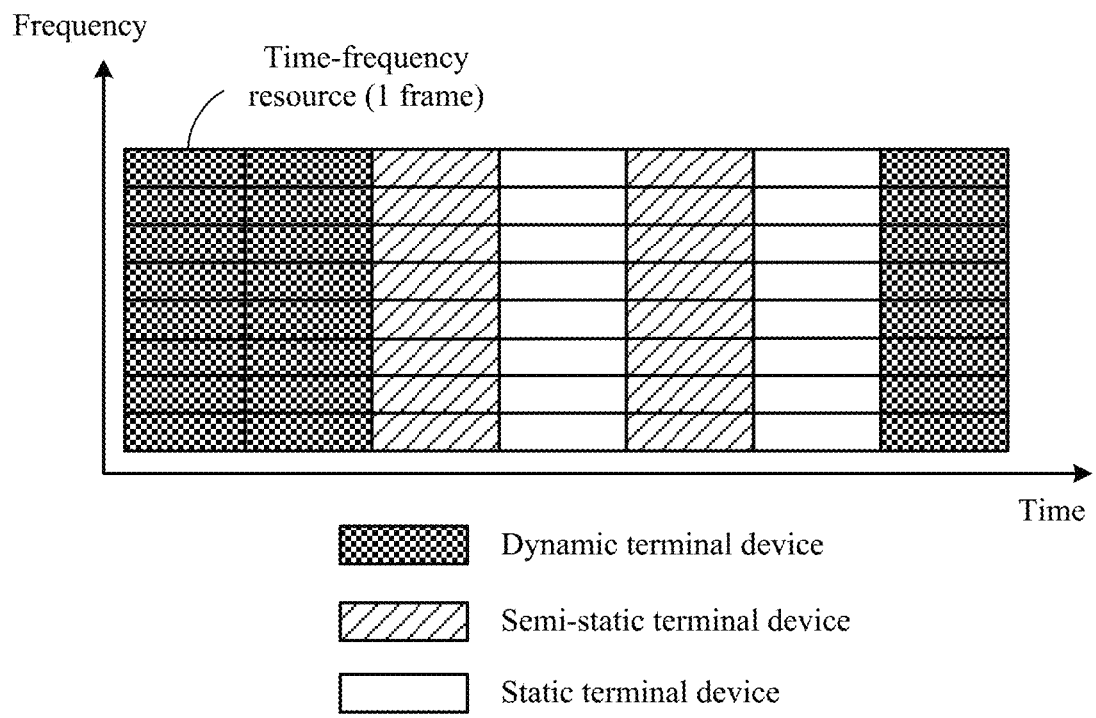
FIG. 7 is a schematic diagram of another time-frequency resource group according to an embodiment of this application.

FIG. 7 is a schematic diagram illustrating that the N time-frequency resource groups are corresponding to different time resources. In FIG. 7, there are three terminal device types, that is, a static terminal device, a semi-static terminal device, and a dynamic terminal device. Time-frequency resources of different types of terminal devices are classified based on time. Terminal devices at different movement speeds occupy time-frequency resources with different timeslots, that is, signals of different types of terminal devices are transmitted alternately in time domain. It should be understood that FIG. 7 is merely an example of classifying time-frequency resources based on time. There may be many grouping rules based on the time, and there may be more terminal device types. This is not limited in this embodiment of this application.

In an optional embodiment, before the network device classifies available time-frequency resources into N time-frequency resource groups based on the N terminal device types, the method further includes:

determining, by the network device, a quantity of terminal devices that are corresponding to the N terminal device types; and the classifying, by the network device, available time-frequency resources into N time-frequency resource groups based on the N terminal device types includes: classifying, by the network device, the available time-frequency resources into N time-frequency resource groups based on the N terminal device types and a quantity of the N terminal devices.

Specifically, when grouping the available time-frequency resources, the network device may consider a quantity of terminal devices corresponding to each terminal device type, allocates a relatively large quantity of time-frequency resources for terminal devices corresponding to terminal device types with a relatively large quantity of terminal devices, and allocates a relatively small quantity of time-frequency resources for terminal devices corresponding to terminal device types with a relatively small quantity of terminal devices. For example, there are three dynamic terminal devices, two semi-static terminal devices, and five static terminal devices. In this case, when grouping the available time-frequency resources, the network device may allocate three-tenths of the time-frequency resources to the dynamic terminal device, allocate two-tenths of the time-frequency resources to the semi-static terminal device, and allocate five-tenths of the time-frequency resources to the static terminal device. In this way, the network device comprehensively considers the N terminal device types and the quantity of terminal devices corresponding to the N terminal device types, so that the time-frequency resources are more flexibly allocated, thereby meeting an actual requirement of the terminal device.

It should be understood that any one of the foregoing manners of grouping the time-frequency resources may be used as a first grouping rule in at least one grouping rule, and the terminal device learns the first grouping rule based on second mapping relationship information.

According to the time-frequency resource allocation method provided in this embodiment of this application, the network device classifies the terminal device into N terminal device types based on a current movement speed, classifies the time-frequency resources into N time-frequency resource groups based on the N terminal device types, and then configures a DMRS with a corresponding time domain density for a time-frequency resource in a time-frequency resource group corresponding to terminal devices with different terminal device types. In this way, the terminal device may transmit uplink data on a corresponding time-frequency resource based on a DMRS whose time domain density is corresponding to a terminal device type of the terminal device. Therefore, in this embodiment of this application, terminal devices at different current movement speeds may use, based on a requirement, a DMRS whose time domain density is corresponding to a current movement speed of the terminal device, so as to ensure accuracy of the network device in estimating a channel of the terminal device, and avoid excessive DMRS overheads in a time-frequency resource used by the terminal device, thereby ensuring transmission efficiency of the uplink data.

It should be understood that sequence numbers of the foregoing processes do not mean execution sequences. The execution sequences of the processes should be determined according to functions and internal logic of the processes, and should not be construed as any limitation on the implementation processes of this embodiment of this application.

The foregoing has described in detail a time-frequency resource allocation method according to an embodiment of this application with reference to FIG. 1 to FIG. 7. The following describes in detail a time-frequency resource allocation apparatus according to an embodiment of this application with reference to FIG. 8 to FIG. 11.

Figure 8:
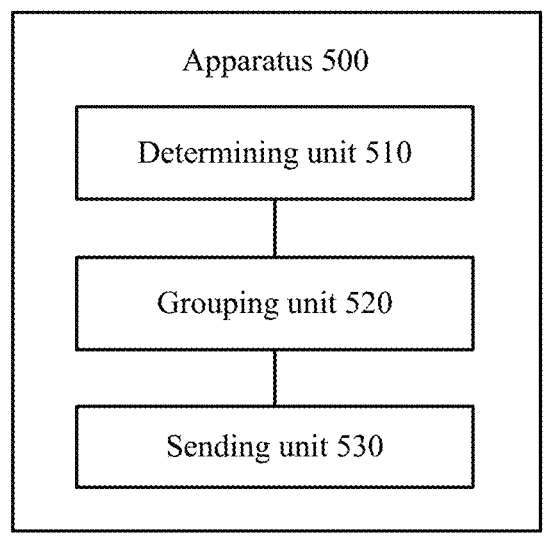
FIG. 8 is a schematic block diagram of a time-frequency resource allocation apparatus according to an embodiment of this application.

FIG. 8 shows a time-frequency resource allocation apparatus 500 according to an embodiment of this application. The apparatus 500 includes:

a determining unit 510, configured to determine N terminal device types based on a current movement speed of a terminal device within a coverage area, where the N terminal device types are in a one-to-one correspondence with N demodulation reference signals DMRSs with different time domain densities;

a grouping unit 520, configured to classify available time-frequency resources into N time-frequency resource groups based on the N terminal device types, where a first DMRS in the N DMRSs is configured for a first time-frequency resource group in the N time-frequency resource groups; and a sending unit 530, configured to send resource indication information to the terminal device based on the N time-frequency resource groups, where the resource indication information is used to indicate a target time-frequency resource allocated by the apparatus to the terminal device or is used to indicate the N time-frequency resource groups; and N is an integer greater than or equal to 2.

Optionally, the N terminal device types include a static terminal device, a semi-static terminal device, and a dynamic terminal device, where the static terminal device is a terminal device whose current movement speed is lower than a first threshold, the semi-static terminal device is a terminal device whose current movement speed is higher than or equal to the first threshold and lower than a second threshold, and the dynamic terminal device is a terminal device whose current movement speed is higher than or equal to the second threshold; and the first threshold is less than the second threshold.

Optionally, the DMRSs with N time domain densities include a sparse DMRS, a conventional DMRS, and a dense DMRS, where the sparse DMRS is a DMRS whose time domain density is less than a third threshold, and the conventional DMRS is a DMRS whose time domain density is greater than or equal to the third threshold and is less than a fourth threshold, and the dense DMRS is a DMRS whose time domain density is greater than or equal to the fourth threshold; the third threshold is less than the fourth threshold; and the static terminal device is corresponding to the sparse DMRS, the semi-static terminal device is corresponding to the conventional DMRS, and the dynamic terminal device is corresponding to the dense DMRS.

Optionally, the resource indication information is carried in grant information, and the resource indication information is used to indicate the target time-frequency resource allocated by the apparatus to the terminal device.

The apparatus further includes a receiving unit, configured to: before the apparatus sends the resource indication information to the terminal device based on the N time-frequency resource groups, receive scheduling request information sent by the terminal device, where the scheduling request information carries a terminal device type of the terminal device.

The determining unit is further configured to determine the target time-frequency resource from the N time-frequency resource groups based on the terminal device type of the terminal device.

Optionally, the terminal device type of the terminal device may be indicated by a type identifier corresponding to the terminal device type, and the determining unit is further configured to:

after the apparatus classifies the available time-frequency resources into N time-frequency resource groups based on the N terminal device types, determine, based on first mapping relationship information, a DMRS corresponding to the terminal device type of the terminal device from the DMRSs with N time domain densities, where the first mapping relationship information is used to indicate a one-to-one correspondence between type identifiers of N terminal device types and the DMRSs with N time domain densities.

The apparatus further includes a configuration unit, configured to configure, for a time-frequency resource in a time-frequency resource group corresponding to the terminal device type of the terminal device, a DMRS corresponding to the terminal device type of the terminal device.

Optionally, the resource indication information is used to indicate information about the N time-frequency resource groups, and the sending unit is specifically configured to broadcast the resource indication information by using a PBCH.

Optionally, the N time-frequency resource groups are obtained through classification by the apparatus according to a first grouping rule in at least one grouping rule. The resource indication information further includes a rule identifier corresponding to the first grouping rule. Before the apparatus broadcasts the resource indication information by using the physical broadcast channel PBCH, the determining unit is further configured to determine a rule identifier of the first grouping rule based on second mapping relationship information, where the second mapping relationship information is used to indicate a one-to-one correspondence between the at least one grouping rule and at least one rule identifier.

Optionally, the first grouping rule is that the N time-frequency resource groups are corresponding to different frequency resources, or the first grouping rule is that the N time-frequency resource groups are corresponding to different time resources.

Optionally, the determining unit is further configured to: before the apparatus classifies the available time-frequency resources into N time-frequency resource groups based on the N terminal device types, determine a quantity of terminal devices that are corresponding to the N terminal device types. The grouping unit is specifically configured to classify the available time-frequency resources into N time-frequency resource groups based on the N terminal device types and a quantity of N terminal devices.

Optionally, the apparatus may be a network device.

It should be understood that the apparatus 500 herein is embodied in a form of a function unit. The term "unit" herein may be an application-specific integrated circuit (ASIC), an electronic circuit, a processor (such as a shared processor, a dedicated processor, or a group processor) for executing one or more software or firmware programs, a memory, a merged logic circuit, and/or another appropriate component supporting the described functions. In an optional example, a person skilled in the art may understand that the apparatus 500 may be specifically the network device in the foregoing embodiments, and the apparatus 500 may be configured to perform procedures and/or steps that are corresponding to the network device in the foregoing method embodiments. To avoid repetition, details are not described herein again.

Figure 9:
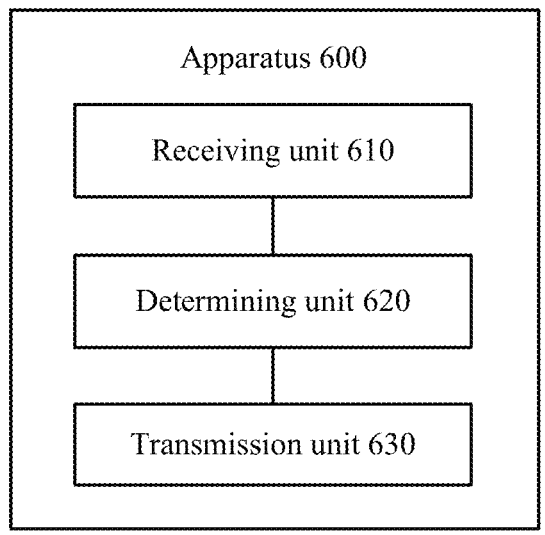
FIG. 9 is a schematic block diagram of another time-frequency resource allocation apparatus according to an embodiment of this application.

FIG. 9 shows a time-frequency resource allocation apparatus 600 according to an embodiment of this application. The apparatus 600 includes:

a receiving unit 610, configured to receive resource indication information sent by a network device, where the resource indication information is used to indicate a target time-frequency resource allocated by the network device to the apparatus or indicate the N time-frequency resource groups;

a determining unit 620, configured to determine the target time-frequency resource based on the resource indication information, where the target time-frequency resource is a time-frequency resource in a target time-frequency resource group that is corresponding to an apparatus type of the apparatus and that is in the N time-frequency resource groups, the N time-frequency resource groups are obtained through classification by the network device based on N apparatus types, the N apparatus types are in a one-to-one correspondence with N demodulation reference signals DMRSs with different time domain densities, a first DMRS in the N DMRSs is configured for a first time-frequency resource group in the N time-frequency resource groups, and the N apparatus types are determined by the network device based on a current movement speed of the apparatus within a coverage area, and N is an integer greater than or equal to 2; and a transmission unit 630, configured to transmit uplink data to the network device by using the target time-frequency resource.

Optionally, the N apparatus types include a static apparatus, a semi-static apparatus, and a dynamic apparatus, where the static apparatus is an apparatus whose current movement speed is lower than a first threshold, the semi-static apparatus is an apparatus whose current movement speed is higher than or equal to the first threshold and lower than a second threshold, and the dynamic apparatus is an apparatus whose current movement speed is higher than or equal to the second threshold; and the first threshold is less than the second threshold.

Optionally, the DMRSs with N time domain densities include a sparse DMRS, a conventional DMRS, and a dense DMRS, where the sparse DMRS is a DMRS whose time domain density is less than a third threshold, and the conventional DMRS is a DMRS whose time domain density is greater than or equal to the third threshold and is less than a fourth threshold, and the dense DMRS is a DMRS whose time domain density is greater than or equal to the fourth threshold; the third threshold is less than the fourth threshold; and the static apparatus is corresponding to the sparse DMRS, the semi-static apparatus is corresponding to the conventional DMRS, and the dynamic apparatus is corresponding to the dense DMRS.

Optionally, the apparatus further includes a sending unit, configured to: before the apparatus receives the resource indication information sent by the network device, send scheduling request information to the network device, where the scheduling request information carries an apparatus type of the apparatus. The receiving unit is specifically configured to receive grant information sent by the network device, where the grant information carries the resource indication information, and the resource indication information is used to indicate the target time-frequency resource allocated by the network device to the apparatus.

Optionally, the apparatus type of the apparatus may be represented by a type identifier corresponding to the apparatus type. A DMRS corresponding to the apparatus type of the apparatus is determined by the network device based on first mapping relationship information, and the first mapping relationship information is used to indicate a one-to-one correspondence between the N apparatus types and the DMRSs with N time domain densities.

Optionally, the resource indication information is used to indicate the N time-frequency resource groups. The receiving unit is specifically configured to broadcast the resource indication information by using a physical broadcast channel PBCH.

Optionally, the N time-frequency resource groups are obtained through classification by the network device according to a first grouping rule in at least one grouping rule. The resource indication information further includes a rule identifier corresponding to the first grouping rule. The determining unit is further configured to determine the target time-frequency resource group based on second mapping relationship information and the resource indication information, where the second mapping relationship information is used to indicate a one-to-one correspondence between the at least one grouping rule and at least one rule identifier.

Optionally, the first grouping rule is that the N time-frequency resource groups are corresponding to different frequency resources, or the first grouping rule is that the N time-frequency resource groups are corresponding to different time resources.

Optionally, the apparatus may be a terminal device.

It should be understood that the apparatus 600 herein is embodied in a form of a function unit. The term "unit" herein may be an application-specific integrated circuit (ASIC), an electronic circuit, a processor (such as a shared processor, a dedicated processor, or a group processor) for executing one or more software or firmware programs, a memory, a merged logic circuit, and/or another appropriate component supporting the described functions. In an optional example, a person skilled in the art may understand that the apparatus 600 may be specifically the terminal device in the foregoing embodiments, and the apparatus 600 may be configured to perform procedures and/or steps that are corresponding to the terminal device in the foregoing method embodiments. To avoid repetition, details are not described herein again.

Figure 10:
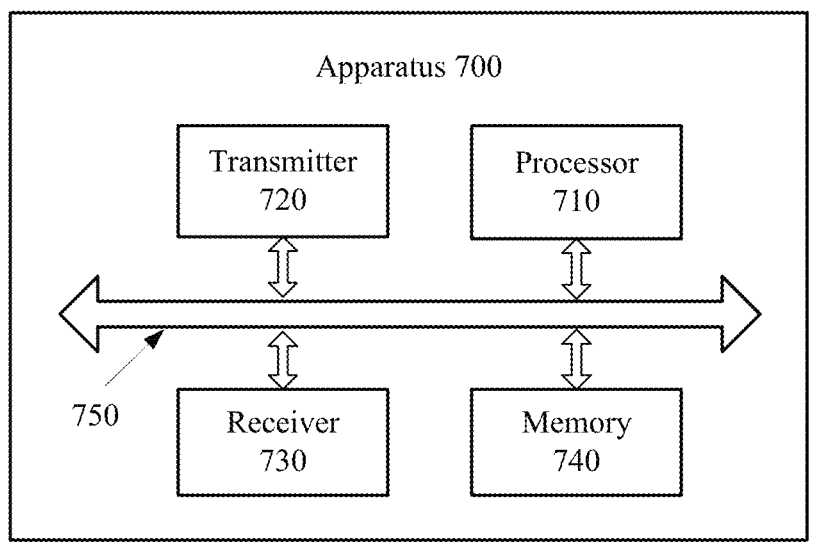
FIG. 10 is a schematic block diagram of another time-frequency resource allocation apparatus according to an embodiment of this application.

FIG. 10 shows a time-frequency resource allocation apparatus 700 according to an embodiment of this application. The apparatus 700 includes a processor 710, a transmitter 720, a receiver 730, a memory 740, and a bus system 750. The processor 710, the transmitter 720, the receiver 730, and the memory 740 are connected by using the bus system 750. The memory 740 is configured to store an instruction. The processor 710 is configured to execute the instruction stored in the memory 740, so as to control the transmitter 720 to send a signal and control the receiver 730 to receive a signal.

The processor 710 is configured to determine N terminal device types based on a current movement speed of a terminal device within a coverage area. The N terminal device types are in a one-to-one correspondence with N demodulation reference signals DMRSs with different time domain densities. The processor 710 is further configured to classify available time-frequency resources into N time-frequency resource groups based on the N terminal device types. Time-frequency resources in the N time-frequency resource groups are separately configured with the N DMRSs.

The transmitter 720 is configured to send resource indication information to the terminal device based on the N time-frequency resource groups, where the resource indication information is used to indicate a target time-frequency resource allocated by the apparatus to the terminal device or is used to indicate the N time-frequency resource groups; and N is an integer greater than or equal to 2.

Optionally, the N terminal device types include a static terminal device, a semi-static terminal device, and a dynamic terminal device, where the static terminal device is a terminal device whose current movement speed is lower than a first threshold, the semi-static terminal device is a terminal device whose current movement speed is higher than or equal to the first threshold and lower than a second threshold, and the dynamic terminal device is a terminal device whose current movement speed is higher than or equal to the second threshold; and the first threshold is less than the second threshold.

Optionally, the DMRSs with N time domain densities include a sparse DMRS, a conventional DMRS, and a dense DMRS, where the sparse DMRS is a DMRS whose time domain density is less than a third threshold, and the conventional DMRS is a DMRS whose time domain density is greater than or equal to the third threshold and is less than a fourth threshold, and the dense DMRS is a DMRS whose time domain density is greater than or equal to the fourth threshold; the third threshold is less than the fourth threshold; and the static terminal device is corresponding to the sparse DMRS, the semi-static terminal device is corresponding to the conventional DMRS, and the dynamic terminal device is corresponding to the dense DMRS.

Optionally, the resource indication information is carried in grant information, and the resource indication information is used to indicate the target time-frequency resource allocated by the apparatus to the terminal device. The receiver 730 is configured to: before the apparatus sends the resource indication information to the terminal device based on the N time-frequency resource groups, receive scheduling request information sent by the terminal device, where the scheduling request information carries a terminal device type of the terminal device. The processor 710 is further configured to determine the target time-frequency resource from the N time-frequency resource groups based on the terminal device type of the terminal device.

Optionally, the terminal device type of the terminal device may be represented by a type identifier corresponding to the terminal device type. The processor 710 is further configured to: after the apparatus classifies the available time-frequency resources into N time-frequency resource groups based on the N terminal device types, determine, from the N DMRSs based on first mapping relationship information, a DMRS corresponding to the terminal device type of the terminal device, where the first mapping relationship information is used to indicate a one-to-one correspondence between type identifiers of the N terminal device types and the N DMRSs. The processor 710 is further configured to configure, for a time-frequency resource in a time-frequency resource group corresponding to the terminal device type of the terminal device, a DMRS corresponding to the terminal device type of the terminal device.

Optionally, the resource indication information is used to indicate information about the N time-frequency resource groups, and the transmitter 720 is specifically configured to broadcast the resource indication information by using a physical broadcast channel PBCH.

Optionally, the N time-frequency resource groups are obtained through classification by the apparatus according to a first grouping rule in at least one grouping rule. The resource indication information further includes a rule identifier corresponding to the first grouping rule. The processor is further configured to: before the apparatus broadcasts the resource indication information by using the PBCH, determine a rule identifier of the first grouping rule based on second mapping relationship information, where the second mapping relationship information is used to indicate a one-to-one correspondence between the at least one grouping rule and at least one rule identifier.

Optionally, the first grouping rule is that the N time-frequency resource groups are corresponding to different frequency resources, or the first grouping rule is that the N time-frequency resource groups are corresponding to different time resources.

Optionally, the processor 710 is further configured to: before the apparatus classifies the available time-frequency resources into N time-frequency resource groups based on the N terminal device types, determine a quantity of terminal devices that are corresponding to the N terminal device types. The processor 710 is specifically configured to classify the available time-frequency resources into N time-frequency resource groups based on the N terminal device types and a quantity of N terminal devices.

Optionally, the apparatus may be a network device.

It should be noted that the apparatus 700 may be specifically the network device in the foregoing embodiments, and may be configured to perform steps and/or procedures that are corresponding to the network device in the foregoing method embodiments. Optionally, the memory 740 may include a read-only memory and a random access memory, and provide an instruction and data for the processor. A part of the memory may further include a non-volatile random access memory. For example, the memory may further store device type information. The processor 730 may be configured to execute the instruction stored in the memory. When the processor executes the instruction stored in the memory, the processor is configured to perform the steps and/or the procedures in the foregoing method embodiments.

Figure 11:
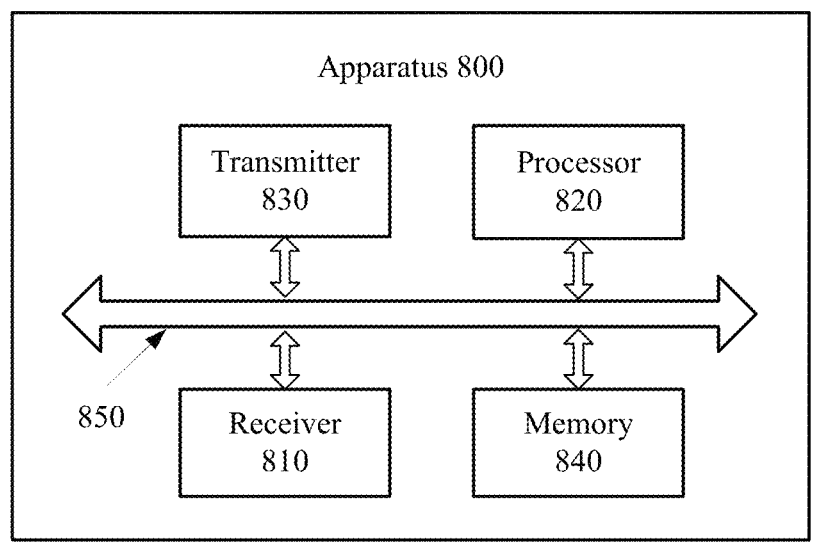
FIG. 11 is a schematic block diagram of another time-frequency resource allocation apparatus according to an embodiment of this application.

FIG. 11 shows a time-frequency resource allocation apparatus 800 according to an embodiment of this application. The apparatus 800 includes a receiver 810, a processor 820, a transmitter 830, a memory 840, and a bus system 850. The receiver 810, the processor 820, the transmitter 830, and the memory 840 are connected to each other by using the bus system 850, the memory 840 is configured to store an instruction, and the processor 820 is configured to execute the instruction stored in the memory 840, so as to control the receiver 810 to receive a signal and control the transmitter 830 to send a signal.

The receiver 810 is configured to receive resource indication information sent by a network device, where the resource indication information is used to indicate a target time-frequency resource allocated by the network device to the apparatus or indicate the N time-frequency resource groups.

The processor 820 is configured to determine the target time-frequency resource based on the resource indication information, where the target time-frequency resource is a time-frequency resource in a target time-frequency resource group that is corresponding to an apparatus type of the apparatus and that is in the N time-frequency resource groups, the N time-frequency resource groups are obtained through classification by the network device based on N apparatus types, the N apparatus types are in a one-to-one correspondence with N demodulation reference signals DMRSs with different time domain densities, a first time-frequency resource group in the N time-frequency resource groups is configured with a first DMRS in the N DMRSs, and the N apparatus types are determined by the network device based on a current movement speed of the apparatus within a coverage area; and N is an integer greater than or equal to 2.

The transmitter 830 is configured to transmit uplink data to the network device by using the target time-frequency resource.

Optionally, the N apparatus types include a static apparatus, a semi-static apparatus, and a dynamic apparatus.

The static apparatus is an apparatus whose current movement speed is lower than a first threshold, the half-static apparatus is an apparatus whose current movement speed is higher than or equal to the first threshold and lower than a second threshold, and the dynamic apparatus is an apparatus whose current movement speed is higher than or equal to the second threshold; and the first threshold is less than the second threshold.

Optionally, the DMRSs with N time domain densities include a sparse DMRS, a conventional DMRS, and a dense DMRS, where the sparse DMRS is a DMRS whose time domain density is less than a third threshold, and the conventional DMRS is a DMRS whose time domain density is greater than or equal to the third threshold and is less than a fourth threshold, and the dense DMRS is a DMRS whose time domain density is greater than or equal to the fourth threshold; the third threshold is less than the fourth threshold; and the static apparatus is corresponding to the sparse DMRS, the semi-static apparatus is corresponding to the conventional DMRS, and the dynamic apparatus is corresponding to the dense DMRS.

Optionally, the transmitter 830 is further configured to: before the apparatus receives the resource indication information sent by the network device, send scheduling request information to the network device, where the scheduling request information carries an apparatus type of the apparatus. The receiver 810 is specifically configured to receive grant information sent by the network device, where the grant information carries the resource indication information, and the resource indication information is used to indicate the target time-frequency resource allocated by the network device to the apparatus.

Optionally, the apparatus type of the apparatus may be represented by a type identifier corresponding to the apparatus type. A DMRS corresponding to the apparatus type of the apparatus is determined by the network device based on first mapping relationship information, and the first mapping relationship information is used to indicate a one-to-one correspondence between the N apparatus types and the N DMRSs.

Optionally, the resource indication information is used to indicate the N time-frequency resource groups. The receiver 810 is specifically configured to broadcast the resource indication information by using a PBCH.

Optionally, the N time-frequency resource groups are obtained through classification by the network device according to a first grouping rule in at least one grouping rule. The resource indication information further includes a rule identifier corresponding to the first grouping rule. The processor is further configured to determine the target time-frequency resource group based on second mapping relationship information and the resource indication information, where the second mapping relationship information is used to indicate a one-to-one correspondence between the at least one grouping rule and at least one rule identifier.

Optionally, the first grouping rule is that the N time-frequency resource groups are corresponding to different frequency resources, or the first grouping rule is that the N time-frequency resource groups are corresponding to different time resources.

Optionally, the apparatus may be a terminal device.

It should be noted that the apparatus 800 may be specifically the terminal device in the foregoing embodiments, and may be configured to perform steps and/or procedures that are corresponding to the terminal device in the foregoing method embodiments. Optionally, the memory 840 may include a read-only memory and a random access memory, and provide an instruction and data for the processor. A part of the memory may further include a non-volatile random access memory. For example, the memory may further store device type information. The processor 820 may be configured to execute the instruction stored in the memory, and when the processor executes the instruction, the processor can perform steps and/or procedures corresponding to the terminal device in the foregoing method embodiments.

It should be understood that, in the embodiment of this application, the processor in the foregoing apparatus may be a central processing unit (CPU), or the processor may be another general purpose processor, a digital signal processor (DSP), an application-specific integrated circuit (ASIC), a field programmable gate array (FPGA), or another programmable logic device, a discrete gate, a transistor logic device, a discrete hardware component, or the like. The general purpose processor may be a microprocessor or the processor may be any conventional processor, or the like.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A time-frequency resource allocation method, comprising:
   determining, by a network device, N terminal device types based on a current movement speed of a terminal device within a coverage area, wherein the N terminal device types are in a one-to-one correspondence with N demodulation reference signals (DMRSs) with different time domain densities, wherein N is an integer greater than or equal to 2;
   classifying, by the network device, available time-frequency resources into N time-frequency resource groups based on the N terminal device types, wherein a first DMRS in the N DMRSs is configured for a first time-frequency resource group in the N time-frequency resource groups; and
   sending, by the network device, resource indication information to the terminal device based on the N time-frequency resource groups, wherein the resource indication information indicates a target time-frequency resource allocated by the network device to the terminal device or the N time-frequency resource groups.

2. The method according to claim 1, wherein the N terminal device types comprise:
   a static terminal device is a terminal device having a current movement speed lower than a first threshold;
   a semi-static terminal device is a terminal device having a current movement speed higher than or equal to the first threshold and lower than a second threshold;
   a dynamic terminal device is a terminal device having a current movement speed higher than or equal to the second threshold; and
   wherein the first threshold is less than the second threshold.

3. The method according to claim 2, wherein:
   the N DMRSs comprise:
     a sparse DMRS is a DMRS having a time domain density less than a third threshold,
     a conventional DMRS is a DMRS having a time domain density greater than or equal to the third threshold and less than a fourth threshold,
     a dense DMRS is a DMRS having a time domain density greater than or equal to the fourth threshold, and
     the third threshold is less than the fourth threshold; and
   the static terminal device is corresponding to the sparse DMRS, the semi-static terminal device is corresponding to the conventional DMRS, and the dynamic terminal device is corresponding to the dense DMRS.

4. The method according to claim 1, wherein:
   the resource indication information is carried in grant information and indicates the target time-frequency resource allocated by the network device to the terminal device; and
   before sending, by the network device, resource indication information to the terminal device based on the N time-frequency resource groups, the method further comprises:
     receiving, by the network device, scheduling request information sent by the terminal device, wherein the scheduling request information carries a terminal device type of the terminal device, and
     determining, by the network device, the target time-frequency resource from the N time-frequency resource groups based on the terminal device type of the terminal device.

5. The method according to claim 1, wherein:
the resource indication information indicates the N time-frequency resource groups; and
sending, by the network device, resource indication information to the terminal device based on the N time-frequency resource groups comprises:
broadcasting, by the network device, the resource indication information by using a physical broadcast channel (PBCH).

6. A time-frequency resource allocation method, comprising:
receiving, by a terminal device, resource indication information sent by a network device, wherein the resource indication information indicates a target time-frequency resource allocated by the network device to the terminal device or N time-frequency resource groups;
determining, by the terminal device, the target time-frequency resource based on the resource indication information, wherein:
the target time-frequency resource is a time-frequency resource in a target time-frequency resource group that is corresponding to N terminal device types of the terminal device and that is in the N time-frequency resource groups, and
the N time-frequency resource groups are obtained through classification by the network device based on the N terminal device types,
the N terminal device types are in a one-to-one correspondence with N demodulation reference signals (DMRSs) with different time domain densities, a first DMRS in the N DMRSs is configured for a first time-frequency resource group in the N time-frequency resource groups, and the N terminal device types are determined by the network device based on a current movement speed of the terminal device within a coverage area, and
N is an integer greater than or equal to 2; and
transmitting, by the terminal device, uplink data to the network device by using the target time-frequency resource.

7. The method according to claim 6, wherein the N terminal device types comprise:
a static terminal device is a terminal device having a current movement speed lower than a first threshold;
a semi-static terminal device is a terminal device having a current movement speed higher than or equal to the first threshold and lower than a second threshold;
a dynamic terminal device is a terminal device having a current movement speed higher than or equal to the second threshold; and
the first threshold is less than the second threshold.

8. The method according to claim 7, wherein:
the N DMRSs comprise:
a sparse DMRS is a DMRS having a time domain density less than a third threshold,
a conventional DMRS is a DMRS having a time domain density greater than or equal to the third threshold and less than a fourth threshold,
a dense DMRS is a DMRS having a time domain density greater than or equal to the fourth threshold, and
wherein the third threshold is less than the fourth threshold; and
the static terminal device is corresponding to the sparse DMRS, the semi-static terminal device is corresponding to the conventional DMRS, and the dynamic terminal device is corresponding to the dense DMRS.

9. The method according to claim 6, wherein:
before receiving, by a terminal device, resource indication information sent by a network device, the method further comprises:
receiving, by the terminal device, scheduling request information sent by the network device, wherein the scheduling request information carries the terminal device type of the terminal device; and
receiving, by a terminal device, resource indication information sent by a network device comprises:
receiving, by the terminal device, grant information sent by the network device, wherein the grant information carries the resource indication information to indicate the target time-frequency resource allocated by the network device to the terminal device.

10. The method according to claim 6, wherein:
the resource indication information indicates the N time-frequency resource groups; and
receiving, by a terminal device, resource indication information sent by a network device comprises:
obtaining, by the terminal device, the resource indication information by using a physical broadcast channel (PBCH).

11. A time-frequency resource allocation apparatus, comprising:
a receiver;
a transmitter;
a processor; and
a memory configured to store instructions which, when executed by the processor, cause the apparatus to:
determine N terminal device types based on a current movement speed of a terminal device within a coverage area, wherein the N terminal device types are in a one-to-one correspondence with N demodulation reference signals (DMRSs) with different time domain densities,
classifying available time-frequency resources into N time-frequency resource groups based on the N terminal device types, wherein a first DMRS in the N DMRSs is configured for a first time-frequency resource group in the N time-frequency resource groups,
instructing the transmitter to send, based on the N time-frequency resource groups, resource indication information to the terminal device, wherein the resource indication information indicates a target time-frequency resource allocated by the apparatus to the terminal device or the N time-frequency resource groups, and
wherein N is an integer greater than or equal to 2.

12. The apparatus according to claim 11, wherein the N terminal device types comprise:
a static terminal device is a terminal device having a current movement speed lower than a first threshold;
a semi-static terminal device is a terminal device having a current movement speed higher than or equal to the first threshold and lower than a second threshold;
a dynamic terminal device is a terminal device having a current movement speed higher than or equal to the second threshold; and
wherein the first threshold is less than the second threshold.

13. The apparatus according to claim 12, wherein:
the N DMRSs comprise:
a sparse DMRS is a DMRS having a time domain density less than a third threshold, the conventional DMRS is a DMRS having a time domain density greater than or equal to the third threshold and less than a fourth threshold, a dense DMRS is a DMRS having a time domain density greater than or equal to the fourth threshold, and wherein the third threshold is less than the fourth threshold; and the static terminal device is corresponding to the sparse DMRS, the semi-static terminal device is corresponding to the conventional DMRS, and the dynamic terminal device is corresponding to the dense DMRS.

14. The apparatus according to claim 11, wherein:

the resource indication information is carried in grant information to indicate the target time-frequency resource allocated by the apparatus to the terminal device;

the receiver is configured to: before the apparatus sends the resource indication information to the terminal device based on the N time-frequency resource groups, receive scheduling request information sent by the terminal device, wherein the scheduling request information carries a terminal device type of the terminal device; and the instructions, when executed by the processor, cause the apparatus to:

determine the target time-frequency resource from the N time-frequency resource groups based on the terminal device type of the terminal device.

15. The apparatus according to claim 11, wherein:

the resource indication information indicates the N time-frequency resource groups; and the transmitter is configured to: broadcast the resource indication information by using a physical broadcast channel (PBCH).

* * * * *